United States Patent
Alaniz et al.

(10) Patent No.: US 8,731,824 B1
(45) Date of Patent: May 20, 2014

(54) NAVIGATION CONTROL FOR A TOUCH SCREEN USER INTERFACE

(71) Applicant: Honda Motor Co., Ltd., Tokyo (JP)

(72) Inventors: Arthur Alaniz, Mountain View, CA (US); Fuminobu Kurosawa, Mountain View, CA (US); Yoshiyuki Habashima, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/834,053

(22) Filed: Mar. 15, 2013

(51) Int. Cl.
*G01C 21/34* (2006.01)
*G06F 3/048* (2013.01)
*G06F 3/041* (2006.01)

(52) U.S. Cl.
USPC .......................................... 701/457; 345/173

(58) Field of Classification Search
USPC .............................................................. 345/4
See application file for complete search history.

(56) References Cited

U.S. PATENT DOCUMENTS

| | | | |
|---|---|---|---|
| 6,278,443 B1 | 8/2001 | Amro et al. | |
| 7,956,847 B2 | 6/2011 | Christie | |
| 2006/0001652 A1 | 1/2006 | Chiu et al. | |
| 2006/0026535 A1* | 2/2006 | Hotelling et al. | 715/863 |
| 2007/0252821 A1 | 11/2007 | Hollemans et al. | |
| 2009/0096753 A1* | 4/2009 | Lim | 345/173 |
| 2010/0295797 A1 | 11/2010 | Nicholson et al. | |
| 2010/0302281 A1* | 12/2010 | Kim | 345/661 |
| 2011/0219330 A1* | 9/2011 | Ando et al. | 715/784 |
| 2011/0320978 A1 | 12/2011 | Horodezky et al. | |
| 2012/0079421 A1* | 3/2012 | Arriola | 715/784 |
| 2012/0226977 A1 | 9/2012 | Lengeling et al. | |
| 2012/0254790 A1 | 10/2012 | Colombino et al. | |
| 2013/0080976 A1* | 3/2013 | Zambrano et al. | 715/830 |

FOREIGN PATENT DOCUMENTS

| | | |
|---|---|---|
| FR | 2969781 | 6/2012 |
| KR | 101154137 | 6/2012 |

\* cited by examiner

*Primary Examiner* — John R Olszewski
*Assistant Examiner* — Jess Whittington
(74) *Attorney, Agent, or Firm* — Rankin, Hill & Clark LLP

(57) ABSTRACT

A vehicle display system includes a display having a display screen which displays an image and provides a touch screen user interface. A controller of the display includes a touch detector which detects a number of fingers touched to a predetermined portion of the display screen, as well as a direction and distance of movement of the number of fingers away from the predetermined portion of the display screen. A navigation mode determiner of the controller determines a navigation mode based on the detected number of fingers. A navigation feature determiner of the controller determines a navigation direction and navigation rate based on the detected direction and distance the number of fingers is moved. An image navigation controller of the controller controls the display to navigate the image displayed on the display screen according to the determined navigation mode, navigation direction, and navigation rate.

20 Claims, 5 Drawing Sheets

NAVIGATION CONTROL FOR A TOUCH SCREEN USER INTERFACE

BACKGROUND

Vehicle interiors may be provided with a display which presents various types of information to a driver via a display screen. Furthermore, to reduce the number of buttons and other control elements provided in the vehicle interior, the display may provide a touch screen user interface which allows a user to select various options and/or perform various controls by directly touching the display screen.

However, such displays may not be optimized for the needs of a driver and/or occupants of a vehicle. For example, existing touch screen enabled operations may require the user to have a level of familiarity with the operation of touch screen user interfaces which may not possessed by all vehicle users. Furthermore, existing touch screen enabled operations may require complex movements difficult for a driver to execute in a brief time period. Further still, existing touch screen enabled operations may also require a complex and expensive touch screen enabled displayed, which may increase the cost and/or reduce the durability of the touch screen enabled display. Accordingly, there may be a need for touch screen enabled vehicle displays which provide a relatively simple method of use and/or a reduced complexity.

BRIEF DESCRIPTION

According to one aspect, a controller is provided for a vehicular display which displays an image on a display screen and provides a touch screen user interface. The controller includes a touch detector, a navigation mode determiner, a navigation feature determiner, and an image navigation controller. The touch detector is configured to detect a number of fingers touched to a predetermined portion of the display screen, and a direction and a distance of a simultaneous movement of all of the number of fingers in a same direction away from the predetermined portion of the display screen. The navigation mode determiner is configured to determine a navigation mode for navigating the image displayed on the display screen as one of a plurality of different navigation modes based on the number of fingers detected to be touched to the predetermined portion of the display screen by the touch detector. The navigation feature determiner is configured to determine a navigation direction based on the direction the number of fingers is detected to simultaneously move in the same direction away from the predetermined portion of the display screen by the touch detector, and a navigation rate based on the distance the number of fingers is detected to simultaneously move in the same direction away from the predetermined portion of the display screen by the touch detector. The image navigation controller is configured to control the vehicular display to navigate the image displayed on the display screen according to the navigation mode determined by the navigation mode determiner, the navigation direction determined by the navigation feature determiner, and the navigation rate determined by the navigation feature determiner.

According to another aspect, a display system for a vehicle includes a display including a display screen which displays an image and provides a touch screen user interface, and a controller configured to control the touch screen user interface. The controller includes a touch detector, a navigation mode determiner, a navigation feature determiner, and an image navigation controller. The touch detector is configured to detect a number of fingers touched to a predetermined portion of the display screen, and a direction and a distance of a simultaneous movement of all of the number of fingers in a same direction away from the predetermined portion of the display screen. The navigation mode determiner is configured to determine a navigation mode for navigating the image displayed on the display screen as one of a plurality of different navigation modes based on the number of fingers detected to be touched to the predetermined portion of the display screen by the touch detector. The navigation feature determiner is configured to determine a navigation direction based on the direction the number of fingers is detected to simultaneously move in the same direction away from the predetermined portion of the display screen by the touch detector, and a navigation rate based on the distance the number of fingers is detected to simultaneously move in the same direction away from the predetermined portion of the display screen by the touch detector. The image navigation controller is configured to control the vehicular display to navigate the image displayed on the display screen according to the navigation mode determined by the navigation mode determiner, the navigation direction determined by the navigation feature determiner, and the navigation rate determined by the navigation feature determiner.

According to yet another aspect, a method is provided for navigating a map presented on a display screen of a vehicular display which provides a touch screen user interface. The method includes detecting a number of fingers touched to a predetermined portion of a display screen of the vehicular display, the predetermined portion being provided at a fixed position on the display screen and sized smaller than an image displaying portion of the display screen on which an image is displayed. The method further includes determining a navigation mode for navigating the image displayed on the display screen as one of a plurality of different navigation modes based on the number of fingers detected to be touched to the predetermined portion of the display screen. The method further includes detecting a direction and distance the number of fingers is simultaneously moved away from the predetermined portion of the display screen. The method further includes determining a navigation direction based on the direction the number of fingers is detected to simultaneously move away from the predetermined portion of the display screen, and a navigation rate based on the distance the number of fingers is detected to simultaneously move away from the predetermined portion of the display screen. The method further includes navigating the image displayed on the display screen according to the determined navigation mode, navigation direction, and navigation rate.

DETAILED DESCRIPTION

Figure 1:
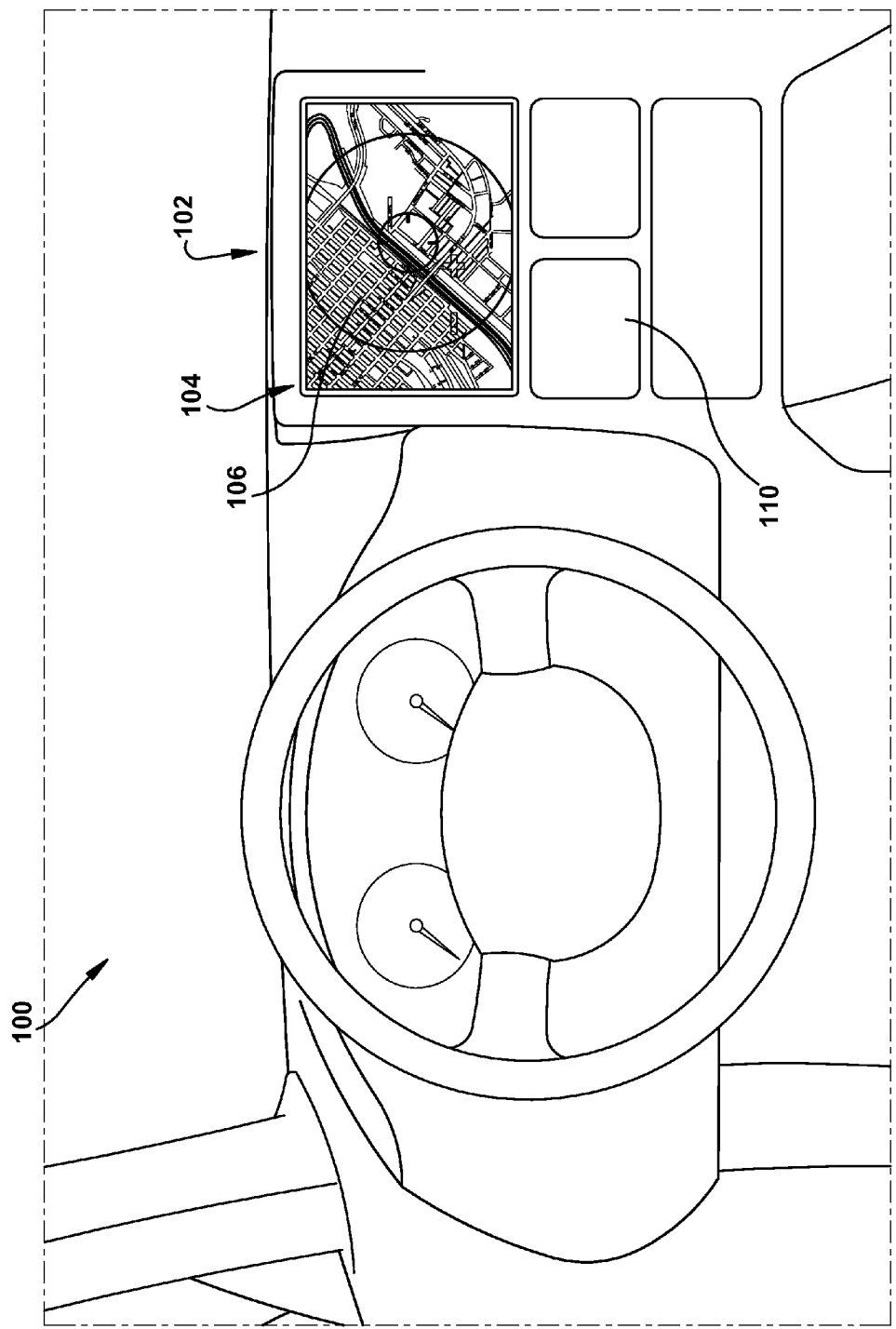
FIG. 1 is a perspective view of a vehicle interior in which a display system is provided.
Figure 2:
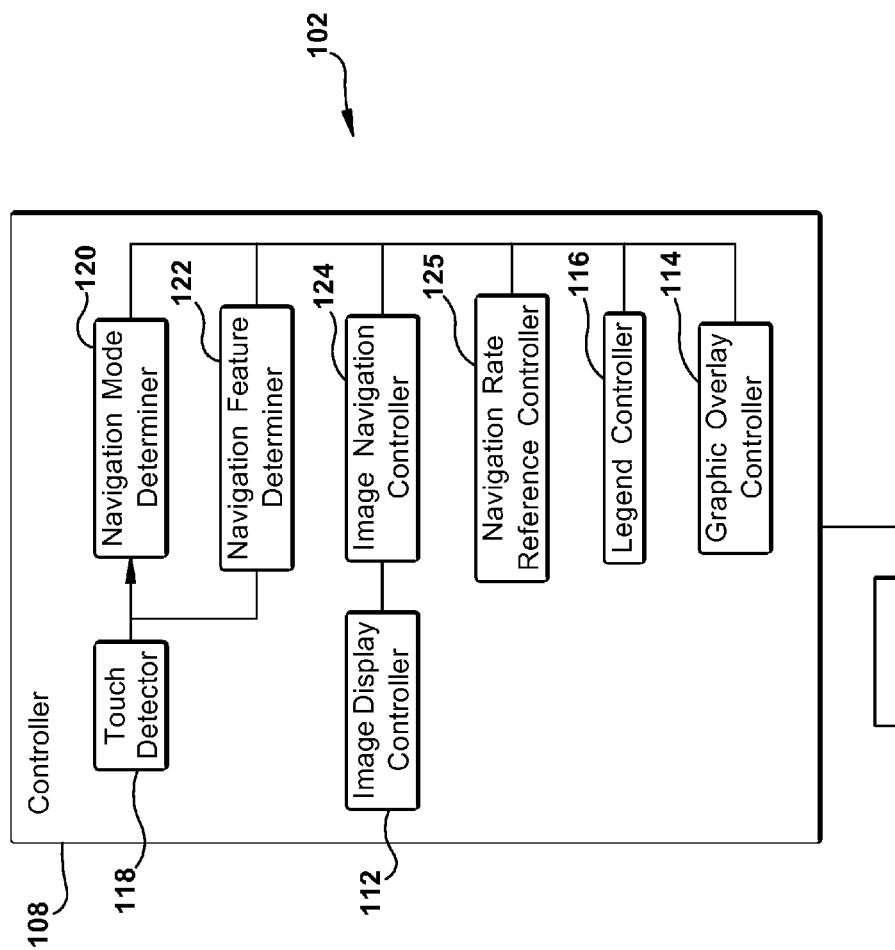
FIG. 2 is a block schematic showing the display system.

Referring to FIGS. 1 and 2, a vehicle interior 100 is provided with a display system 102 which includes a display 104

("vehicular display") having a display screen 106 (see FIG. 1), and a controller 108 (see FIG. 2). The display 104 and display screen 106 are provided such that the display screen 106 is within view of vehicle occupants. For example, the display 104 and display screen 106 may be provided on a center instrument panel 110 in the vehicle interior 100, as shown in FIG. 1, or at any other location within the vehicle interior. The controller 108 may be provided within the display 104, or separately therefrom (while being in communication therewith).

The display system 102 is configured such that the display 104 operates as a touch screen user interface via the display screen 106. Accordingly, a user may operate the display system 102 by touching one or more fingers to the display screen 106, and/or moving the one or more fingers along the display screen 106. While it is to be appreciated that various functions and/or operations may be enabled by the touch screen user interface provided by the display system 102, the instant disclosure describes a touch screen user interface function/operation which allows a user to navigate an image displayed on the display screen 106. The navigation may be of any image presented on the display screen 106, though the remainder of the instant disclosure will focus on the image being a map.

With regard to navigation, the map may be considered to be a very large image, with only a part thereof displayed on the display screen 106 at a certain size. Navigating the map may include scrolling, whereby the map is moved in a vertical direction, a horizontal direction, a diagonal direction, etc., so as to display a different portion of the map on the display screen 106. Navigating the map may also include zooming, whereby the map is enlarged (zoom-in) with a smaller geographic area presented on the display screen 106, or shrunken (zoom-out) with a larger geographic area presented on the display screen. Other types of navigation of the map may also be enabled by the display system 102 (e.g., simultaneous scrolling and zooming, etc.)

The display system 102 may include any necessary or beneficial components which enable the display of the map on the display screen 106 and the touch screen operability. These components may be included in the controller 108, or a different controller(s) provided by or in communication with the display system 102. The instant disclosure describes a navigation operation for navigating the map (or other image) displayed on the display screen 106, and therefore only provides specific description of those components of the display system 102 and/or controller 108 which relate to the navigation operation. Those components not described herein may take the form of any components which enable the image display and touch screen capabilities of the display system 102.

To facilitate navigation of the map (image) on the display screen 106, the controller 108 includes an image display controller 112, a graphic overlay controller 114, a legend controller 116, a touch detector 118, a navigation mode determiner 120, a navigation feature determiner 122, an image navigation controller 124, and a navigation rate reference controller 125. The controller 108 and/or any of the elements described herein as being included in the controller 108 may be provided as one or more processors (arithmetic processors), computers, hardware components, software components, etc., which are configured to perform the herein-described functions. It is to be appreciated that any of the herein-described image display controller 110, graphic overlay controller 112, legend controller 114, touch detector 116, navigation mode determiner 118, navigation feature determiner 120, image navigation controller 122, and navigation rate reference controller 125, may be combined with one another, or provided by more than one processor (arithmetic processor), computer, hardware component, software component, etc. The components of the controller 108 will be described with reference to FIGS. 2-5.

The image display controller 112 controls the display 104 to present the map (or other image) on the display screen 106. The image display controller 112 may include a memory or database including data related to the map as well as other processors, computers, hardware components, software components, etc., which communicate with and control the display 104 such that the display presents the map on the display screen 106. As will be appreciated with reference to the below description, the image display controller 112 may cooperate with the image navigation controller 124 to change the map displayed on the display screen 106.

The remaining components of the controller 108 are configured to control the display 104 so as to allow the user to navigate the map displayed on the display screen 106 using the display screen 106 as a touch screen user interface. In this regard, to simplify use of the display system 102 as a touch screen user interface, the display system 102 is operable such that a user may navigate the map shown on the display screen 106 by first touching a particular number of fingers to a predetermined portion of the display screen 106. The predetermined portion of the display screen 106 may be provided at a fixed position on the display screen 106 and may be sized smaller than an image displaying portion 126 (see FIG. 3) of the display screen 106.

Figure 3:
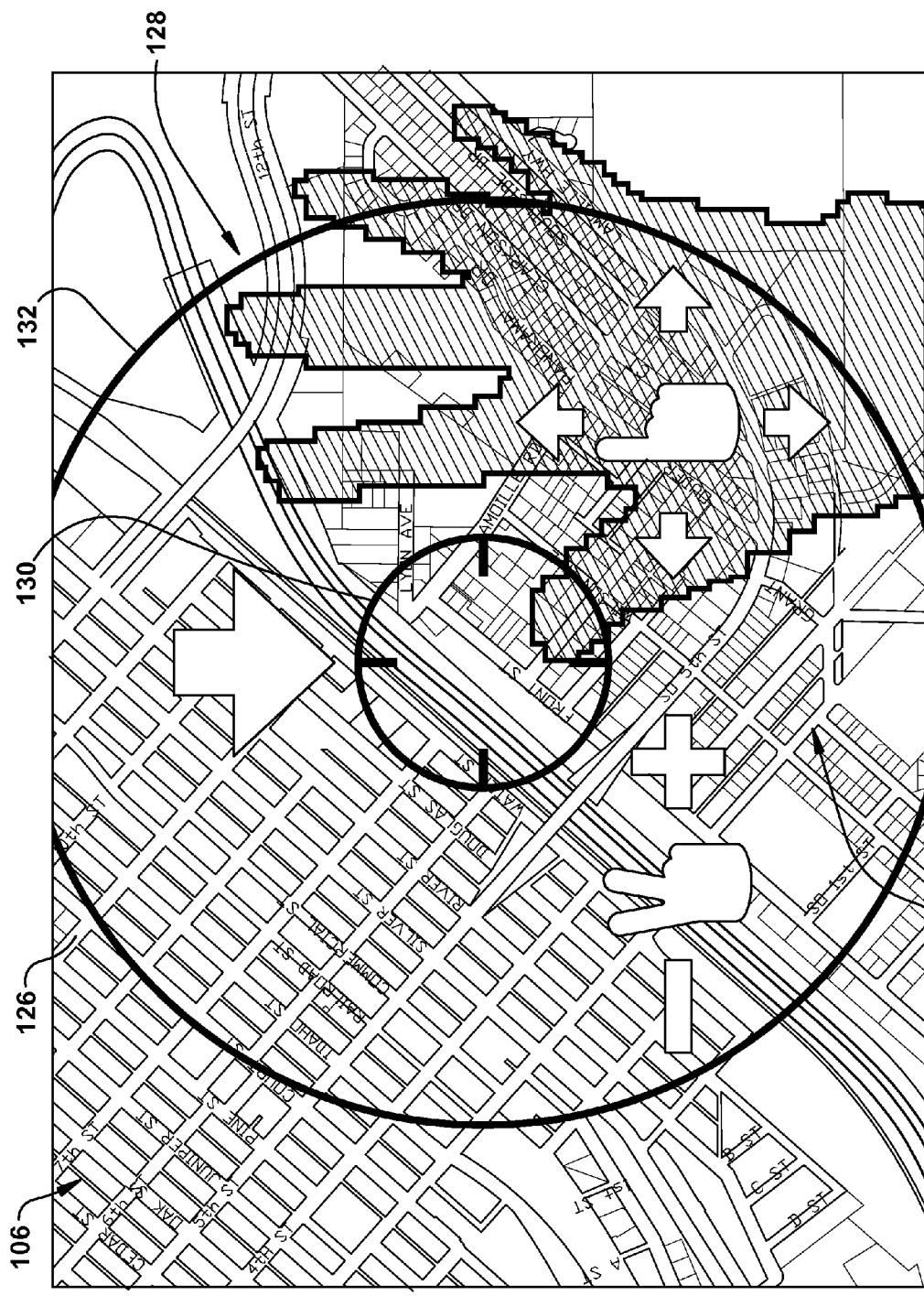
FIG. 3 shows a display screen of the display system prior to a user touching a predetermined portion of the display screen.

The graphic overlay controller 114 is configured to control the display 104 to present a graphic overlay 128 on the display screen 106 over the map shown on the display screen 106. The graphic overlay 128 may be presented to indicate a position and boundary of the predetermined portion of the display screen 106, and to provide the use with a sense of scale when providing a navigation instruction via the touch screen user interface provided by the display screen 106. As shown in FIG. 3, the graphic overlay 128 includes a first graphic overlay element 130 and a second graphic overlay element 132, though the graphic overlay 128 may be provided in a different manner while remaining within the scope of the instant disclosure.

The first graphic overlay element 130 is provided as a circle (a geometric shape) which surrounds the predetermined portion of the display screen 106. The second graphic overlay element 132 is also provided as a circle (a geometric shape) which has a size larger than that of the first graphic overlay element 130 and is positioned so as to concentrically surround the first graphic overlay element 130. Accordingly, the first graphic overlay element 130 indicates to the user the position of the predetermined portion of the display screen 106. The second graphic overlay element 132 may provide the user with a sense of scale when moving fingers touched to the display screen 106 away from the predetermined portion of the display screen 106 surrounded by the first graphic overlay element 130 to provide a navigation instruction.

The display system 102 allows the user to navigate the map shown on the display screen 106 using various navigation modes. For example, the user may scroll the map or zoom-in or zoom-out on the map. In this regard, the display system 102 allows the user to select the desired navigation mode from among a plurality of different navigation modes by touching the predetermined portion of the display screen 106 with a particular number of fingers associated with the desired navigation mode. To assist the user in selecting the appropriate navigation mode, and in navigating using the selected navigation mode, the legend controller 116 controls the display 104 to present at least one of a plurality of different legends on the display screen 106.

The plurality of different legends may include a general legend and legends associated with a unique one of the plurality of different navigation modes. The general legend 134 instructs the user on the available navigation modes, and the method for using the available navigation modes. The legends associated with the different navigation modes instruct the user on using the selected navigation mode.

The display system 102 is described herein as being operable in two different navigation modes, though it is to be appreciated that fewer or more navigation modes may be used while remaining within the scope of the instant disclosure. A first navigation mode is a scrolling mode in which the map shown on the display screen 106 is scrolled, and a second navigation mode is a zooming mode wherein the map shown on the display screen 106 is zoomed-in or zoomed-out. Moreover, the display system 102 is described herein as having scrolling mode activated via a single-finger touch to the predetermined portion of the display screen 106, and the navigation mode activated via a two-finger touch to the predetermined portion of the display screen 106.

Accordingly, the general legend 134 may be presented on the display screen 106 when the user is not touching any fingers to the display screen 106. Accordingly, the general legend 134 presents the user with options for different navigation modes. As shown in FIG. 3, the general legend 134 presents an instruction for the user to touch one or more fingers to the predetermined portion of the display screen 106, as well as instructions related to the navigation mode associated with touching different numbers of fingers to the predetermined portion of the display screen 106. In this regard, the general legend 134 may include miniature or simplified versions of a scroll legend 136 associated with the scrolling mode and a zoom legend 138 associated with the zooming mode (scroll legend 136 and zoom legend 138 are described below).

Figure 4:
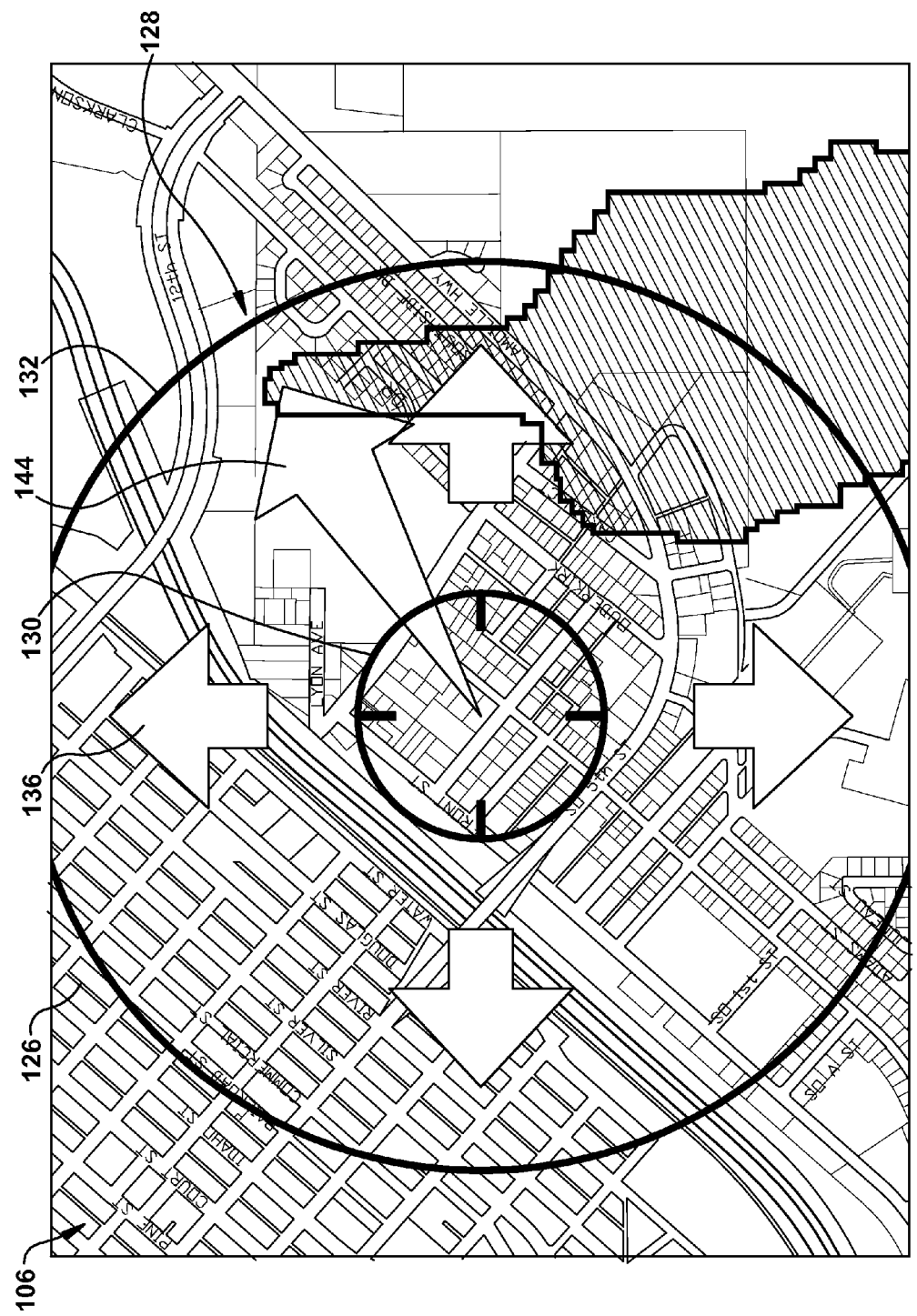
FIG. 4 shows the display screen in a state where the user touched the predetermined portion of the display screen with one finger and moved the one finger away from the predetermined portion of the display screen.

Once the user touches one or more fingers to the predetermined portion of the display screen 106, the legend controller 116 controls the display 104 to remove the general legend 134 and to present a legend associated with the navigation mode selected by the user. Referring to FIG. 4, the scroll legend 136 is presented to the user once the user touches the single finger to the predetermined portion of the display screen 106. The scroll legend 136 presents a plurality of arrows surrounding the predetermined portion of the display screen 106 and the first graphic overlay element 130, and pointing outwardly therefrom. Accordingly, the scroll legend 136 indicates to the user that movement of the single finger away from the predetermined portion of the display screen 106 and the first graphic overlay element 130 in the direction of any of the plurality of arrows instructs scrolling in the direction of movement of the single finger.

Figure 5:
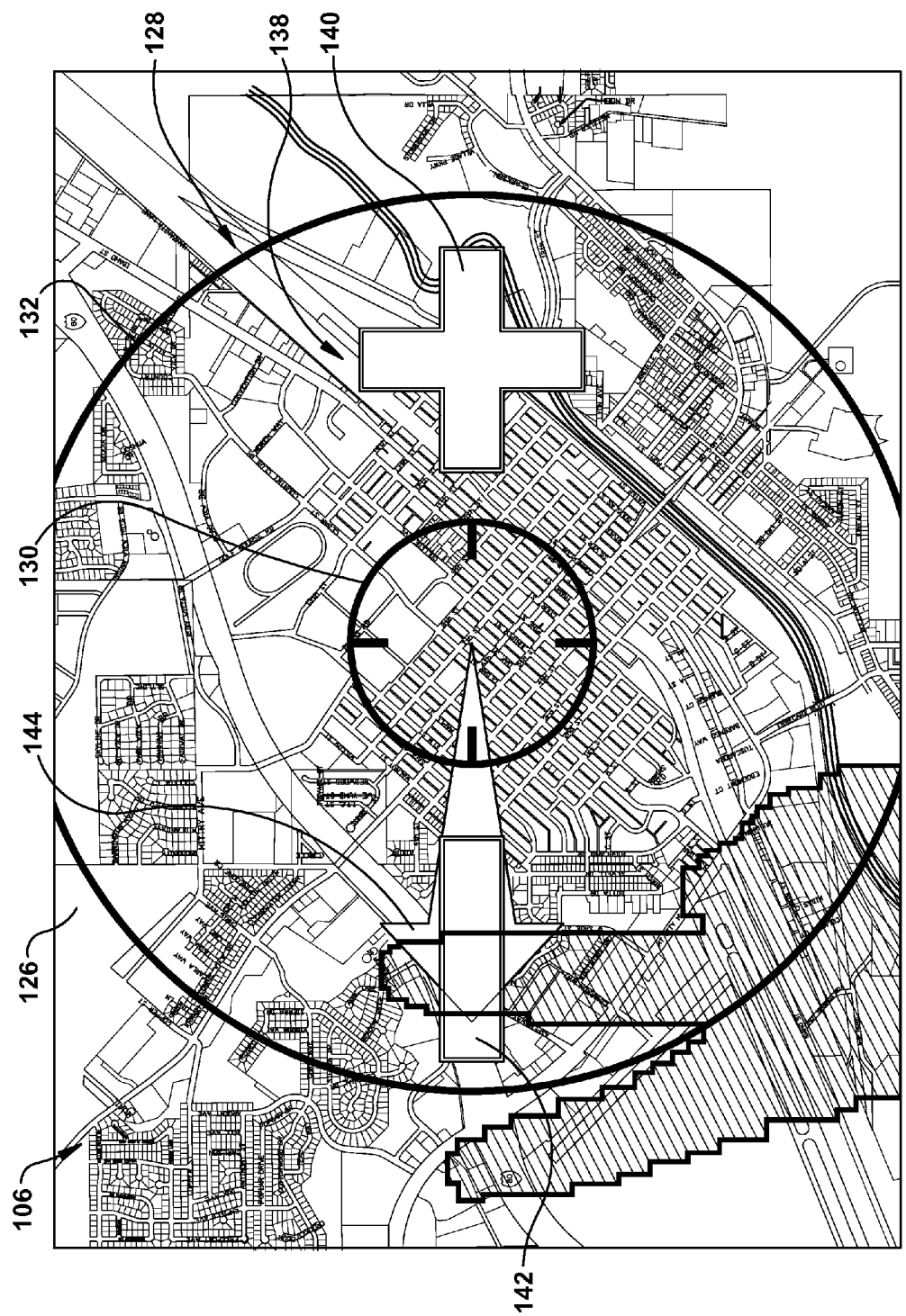
FIG. 5 shows the display screen in a state where the user touched the predetermined portion of the display screen with two fingers and moved the two fingers away from the predetermined portion of the display screen.

The zoom legend 138 is presented to the user once the user touches two fingers (simultaneously) to the predetermined portion of the display screen 106. Referring to FIG. 5, the zoom legend 138 includes a zoom-in icon 140 on a first side of the predetermined portion of the display screen 106 and the first graphic overlay element 130, and a zoom-out icon 142 on the second side of the predetermined portion of the display screen 106 and the first graphic overlay element 130. The first side of the predetermined portion of the display screen 106 and the first graphic overlay element 130 may be opposite to the second side. The zoom legend 138 indicates to the user that simultaneous movement of the two fingers in a first direction toward the first side and zoom-in icon 140 instructs zoom-in navigation of the map shown on the display screen 106. Simultaneous movement of the two fingers in the second direction toward the second side and the zoom-out icon 142 instructs zoom-out navigation of the map displayed on the display screen 106.

It is to be appreciated that different types of legends may be presented on the display screen 106 by the legend controller 116. It is also to be appreciated that as different types of navigation modes are made available to the user, additional and/or different legends may be presented on the display screen 106 by the legend controller 116 controlling the display 104. Furthermore, the legend controller 116 may be configured so as to only present a legend once a navigation mode is selected by the user by touching a certain number of fingers to the predetermined portion of the display screen 106 (i.e., the general legend 134 may be omitted).

The touch detector 118 detects a touch of the user's finger(s) to the predetermined portion of the display screen 106. More particularly, the touch detector 118 detects a number of fingers touched to the predetermined portion of the display screen 106. Referring to the exemplary description provided above, the touch detector 118 detects a single finger touched to the predetermined portion of the display screen 106 or two fingers touched to the predetermined portion of the display screen 106.

In addition to detecting the touch and the number of fingers touched to the predetermined portion of the display screen 106, the touch detector 118 also detects movement of the (number of) finger(s) touched to the predetermined portion of the display screen 106. Particularly, the touch detector 118 is configured to detect a direction that the finger(s) touched the predetermined portion of the display screen 106 is (are) moved away from the predetermined portion of the display screen 106. Additionally, the touch detector 118 is also configured to detect a distance that the finger(s) touched to the predetermined portion of the display screen 106 is (are) moved.

In this regard, navigation of the map shown on the display screen 106 is made by the user touching a particular number of fingers to the predetermined portion of the display screen 106 and moving those fingers simultaneously in a same direction away from the predetermined portion of the display screen 106. In other words, when two fingers are touched to the predetermined portion of the display screen 106, navigation is achieved by moving those two fingers simultaneously and together away from the predetermined portion of the display screen 106 in a same direction (see FIG. 5).

The touch detector 118 may be configured to detect movement of the finger(s) across the display screen 106 (i.e., two-dimensional movement detection), or away from the display screen (i.e., three-dimensional movement detection). The below disclosure describes the touch detector 118 and the display system 102 as using two-dimensional movement detection, though it is to be appreciated that three dimensional movement detection may alternatively or additionally be used. For example, three-dimensional movement detection may be provided only for the zooming mode. To enable three-dimensional movement detection, the touch detector 118 may communicate with one or more sensors which detect movement (e.g., distance and direction of movement) of the user's hand/finger(s) away from the display screen 106.

With respect to the touch detector 118 detecting the two-dimensional movement direction and distance of the finger(s) touched to and moved away from the predetermined portion of the display screen 106, the touch detector 118 may operate across an entirety of the image displaying portion 126 and/or may be limited to remain with the second graphic overlay element 132, with movement beyond the second graphic overlay element 132 being regarded as a maximum movement. By limiting the touch detector 118 detection of the finger movement distance within the second graphic overlay element 132, the user may be provided with a sense of scale regarding a desired navigation rate (as is described in further detail below).

As addressed above, the display system 102 allows the user to select a desired navigation mode from among a plurality of different navigation modes by touching a different number of fingers to the predetermined portion of the display screen 106. In this regard, the navigation mode determiner 120 determines the navigation mode desired by the user, and which is to be used for navigating the map displayed on the display screen 106, as being one of the plurality of different navigation modes. Particularly, the navigation mode determiner 120 receives an input from the touch detector 118 indicating the number of fingers detected to be touched to the predetermined portion of the display screen 106. Based on the number of fingers detected to be touched to the predetermined portion of the display screen 106, the navigation mode determiner 120 determines the navigation mode from among the plurality of different navigation modes. For example, when a first number of fingers are detected to be touched to the predetermined portion of the display screen 106 by the touch detector 118, the navigation mode determiner 120 determines the navigation mode to be a first navigation mode, when a second number of fingers are detected to be touched to the predetermined portion of the display screen 106 by the touch detector 118, the navigation mode determiner 120 determines the navigation mode to be a second navigation mode, etc.

In the example described above, when the touch detector 118 detects that a single finger is touched to the predetermined portion of the display screen 106, the navigation mode determiner determines the navigation mode to be the scrolling mode. When the touch detector 118 detects two fingers touched to the predetermined portion of the display screen 106, the navigation mode determiner determines the navigation mode to be the zooming mode. The navigation mode determiner is operable with any number of different navigation modes based on any number and/or other variants in fingers touched to the predetermined portion of the display screen 106.

The detected direction and distance of simultaneous movement of the finger(s) away from the predetermined portion of the display screen 106 is used to determine a navigation direction and a navigation rate, respectively. In this regard, the navigation feature determiner 122 receives an input from the touch detector 118 indicating the direction and distance of finger movement away from the predetermined portion of the display screen 106 (i.e., out of the first graphic overlay element 130), determines the navigation direction based on the direction the finger(s) is (are) detected to simultaneously move in the same direction away from the predetermined portion of the display screen 106 (i.e., out of the first graphic overlay element 130) by the touch detector 118, and determines the navigation rate based on the distance the finger(s) is (are) detected to simultaneously move in the same direction away from the predetermined portion of the display screen 106 by the touch detector 118.

With reference to FIG. 4, the navigation direction for the scrolling mode is determined by the navigation feature determiner 122 to be the direction in which the single finger is detected to be moved away from the predetermined portion of the display screen 106 (i.e., out of the first graphic overlay element 130) by the touch detector 118. The direction may be a vertical direction, a horizontal direction and/or any diagonal direction.

With reference to FIG. 5, the navigation direction for the zooming mode determined by the navigation feature determiner 122 may either be a zoom-in direction or a zoom-out direction. The zoom-in and zoom-out directions are instructed by finger movement and are each associated with finger movement in a specific direction. In this regard, when the touch detector 118 detects movement of the two fingers away from the predetermined portion of the display screen 106 (i.e., out of the first graphic overlay element 130) toward the second side (i.e., the zoom-out icon 142), the navigation feature determiner 122 determines the navigation direction to be the zoom-out navigation direction. When the touch detector 118 detects movement of the two fingers away from the predetermined portion of the display screen 106 (i.e., out of the first graphic overlay element 130) toward the first side (i.e., the zoom-in icon 140), the navigation feature determiner 122 determines the navigation direction to be the zoom-in navigation direction.

The navigation feature determiner 122 may determine the navigation rate associated with any of the navigation modes to increase as the distance the finger(s) is (are) detected to move in the same direction away from the predetermined portion of the display screen 106 by the touch detector 118 increases, and vice versa. In this regard, the user may control the rate of navigation of the map shown on the display screen 106 based on the distance the user moves the finger(s) touched to the predetermined portion of the display screen 106 away from the predetermined portion of the display screen 106. With reference to the scrolling mode and zooming mode, as the distance the user moves the single finger or two fingers (simultaneously and in the same direction) away from the predetermined portion of the display screen 106, the navigation rate for scrolling along the map or zooming in or out on the map may proportionally increase, and vice versa.

The image navigation controller 124 receives inputs from the navigation mode determiner 120 and the navigation feature determiner 122, and controls the display 104 to navigate the map displayed on the display screen 106 according to the navigation mode determined by the navigation mode determiner 120, the navigation direction determined by the navigation feature determiner 122, and the navigation rate determined by the navigation feature determiner 122. In other words, the image navigation controller 124 controls the display 104 such that the map is scrolled or zoomed in accordance with the instruction provided by the user (i.e., based on the number of fingers detected to be touched to the predetermined portion of the display screen 106, and the direction and distance the finger(s) are detected to be moved away from the predetermined portion of the display screen 106). As noted above, the image navigation controller 124 may cooperate with the image display controller 112 to display the necessary portion of the map at the desired size (magnification).

To provide the user with feedback while navigating the map shown on the display screen 106, the navigation rate reference controller 125 controls the display 104 to present a navigation rate reference marker 144 on the display screen 106 over the map. The navigation rate reference marker 144 may be an arrow or line having a first end located in the predetermined portion of the display screen 106 and within the first graphic overlay element 130, and a second end at a position corresponding to that of the finger(s) touched to the display screen 106 following simultaneous movement of the finger(s) in the same direction away from the predetermined portion of the display screen 106.

Accordingly, the navigation rate reference marker 144 enlarges as the distance the number of fingers is moved away from the predetermined portion of the display screen 106 increases. Consequently, the navigation rate reference marker 144 enlarges as the navigation rate increases. The navigation rate reference controller 125 may control the display 104 such that the navigation rate reference marker 144 remains within the second graphic overlay element 132, or may control the display 104 such that the navigation rate reference marker 144 may be positioned anywhere on the imaging displaying portion 126.

In operation (i.e., a method for navigating the map presented on the display screen 106 of the display 104), the image display controller 112 controls the display 104 to present the map on the display screen 106. Only a particular portion of the map is presented on the display screen 106, which may correspond to a geographic position of the vehicle. At this time, the graphic overlay controller 114 controls the display 104 to present the graphic overlay 128, and the legend controller 116 controls the display 104 to present the general legend 134.

With reference to the above-described exemplary embodiment wherein the plurality of different navigation modes includes the scrolling mode and the zooming mode, with the scrolling mode associated with a single-finger touch within the predetermined portion of the display screen 106, and the zooming mode associated with a two-finger touch within the predetermined portion of the display screen 106, the display system 102 presents the display screen 106 to appear as shown in FIG. 3. Particularly, the graphic overlay 128 is presented with the first graphic overlay element 130 being a circle which surrounds the predetermined portion of the display screen 106, and the second graphic element 132 being a circle larger than and concentrically provided with the first graphic overlay element 130. Furthermore, the general legend 128 is presented to include miniature or simplified versions of the scroll legend 136 and the zoom legend 138.

To initiate navigation of the map shown on the display screen 106, the user touches a particular number of fingers to the predetermined portion of the display screen 106 within the first graphic overlay element 130. Based on the number of fingers touched to the predetermined portion of the display screen 106, as detected by the touch detector 118, the navigation mode determiner 120 determines the navigation mode from among the plurality of different navigation modes. The legend controller 116 then controls the display 104 to present the legend associated with the determined navigation mode on the display screen 106 as an overlay on the map.

With reference to the above-described exemplary embodiment, when the touch detector 118 detects a single finger touched to the predetermined portion of the display screen 106 (i.e., within the first graphic overlay element 130), the navigation mode determiner 120 determines the navigation mode to the scrolling mode. The legend controller 116 then controls the display 104 to present the scroll legend 136 on the display screen 106 as an overlay on the map, as shown in FIG. 4. When the touch detector 118 detects two fingers touched to the predetermined portion of the display screen 106 (i.e., within the first graphic overlay element 130), the navigation mode determiner 120 determines the navigation mode to the zooming mode. The legend controller 116 then controls the display 104 to present the zoom legend 138 on the display screen 106 as an overlay on the map, as shown in FIG. 5.

The user can then control the navigation direction and navigation rate by moving the finger(s) touched to the predetermined portion of the display screen 106 in a particular direction and a particular distance away from the predetermined portion of the display screen 106. The touch detector 118 detects the direction and distance of movement of the finger(s), and communicates the information to the navigation feature determiner 122. Based on the direction and distance of movement of the finger(s) away from the predetermined portion of the display screen 106, the navigation feature determiner 122 determines the navigation direction and navigation rate.

The image navigation controller 124 then controls the display 104 to navigate the map shown on the display screen 106 according to the navigation mode determined by the navigation mode determiner 120 and the navigation rate and navigation direction determined by the navigation feature determiner 122. Additionally, the navigation rate reference controller 125 controls the display 104 to present the navigation rate reference marker 144 with the first end of the navigation rate reference marker 144 within the predetermined portion of the display screen 106 (i.e., within the first graphic overlay element 130), and the second end of the navigation rate reference marker 144 at the position of the fingers of the user which have been moved away from the predetermined portion of the display screen 106 and/or at an end of the second graphic overlay element 132.

With reference to the above-described exemplary embodiment, when the user has touched a single finger to the predetermined portion of the display screen 106, the user may navigate the map in the scrolling mode by moving the single finger in any direction away from the predetermined portion of the display screen 106 (i.e., the first graphic overlay element 130). In this regard, the scroll legend 136 instructs the user that scrolling in any direction may be accomplished by moving the single finger in that direction by providing the plurality of arrows which surround and point outwardly from the first graphic overlay element 130. When the user moves the single finger away from the predetermined portion of the display screen 106 and the first graphic overlay element 130, the touch detector 118 detects the direction in which the single finger is moved and the distance the single finger is moved away from the predetermined portion of the display screen 106 and the first graphic overlay element 130.

Based on the detected direction and distance of movement of the single finger away from the predetermined portion of the display screen and the first graphic overlay element 130, the navigation feature determiner 122 determines the navigation direction and navigation rate for navigation in the scrolling mode. Particularly, the navigation direction is determined by the navigation feature determiner 122 to be the direction in which the single finger is moved away from the predetermined portion of the display screen and the first graphic overlay element 130. The navigation (scrolling) rate is determined to be proportional to the distance the single finger is moved away from the predetermined portion of the display screen and the first graphic overlay element 130.

The image navigation controller 124 then controls the display 104 to navigate the map shown on the display screen 106 in the scrolling mode (as determined by the navigation mode determiner 120) and in the navigation direction and at the navigation rate determined by the navigation feature determiner 122. More specifically, the image navigation controller 124 controls the display 104 to scroll along the map shown on the display screen 106 n the navigation direction and at the navigation rate determined by the navigation feature determiner 122.

At the same time, the navigation rate reference controller 125 controls the display 104 to present the navigation rate reference marker 144 with the first end in the predetermined portion of the display screen 106 and within the first graphic overlay element 130, and the second end to be either at the position of the single finger after it has been moved away from the predetermined portion of the display screen 106, or at the second graphic overlay element 132 when the single finger is moved past the second graphic overlay element 132. Alternatively, the second end of the navigation rate reference marker 144 may be allowed to be placed anywhere on the image displaying portion 126 of the display screen 106 (i.e., beyond the second graphic overlay element 132).

When the user has touched two fingers to the predetermined portion of the display screen 106, the user may navigate the map in the zooming mode by simultaneously moving the two fingers in one of the first direction and second direction away from the predetermined portion of the display screen 106 (i.e., the first graphic overlay element 130). In this regard, the zoom legend 138 includes the zoom-in icon 140 positioned to the first side of the first graphic overlay element 130 so as to instruct the user to move the two fingers in the first direction to instruct zoom-in. The zoom legend 138 also includes the zoom-out icon 142 positioned to the second side of the first graphic overlay element 130 so as to instruct the user to move the two fingers in the second direction to instruct zoom-out.

When the user simultaneously moves the two fingers away from the predetermined portion of the display screen 106 and the first graphic overlay element 130, the touch detector 118 detects the direction in which the two fingers are moved, and the distance the two fingers are moved away from the predetermined portion of the display screen 106 and the first graphic overlay element 130. Based on the detected direction and distance of movement of the two fingers away from the predetermined portion of the display screen and the first graphic overlay element 130, the navigation feature determiner 122 determines the navigation direction and navigation rate for navigation in the zooming mode. Particularly, the navigation direction is determined by the navigation feature determiner 122 to be the zoom-in direction when the two fingers are moved away from the predetermined portion of the display screen 106 and the first graphic overlay element 130 in the first direction. The navigation direction is determined by the navigation feature determiner 122 to be the zoom-out direction when the two fingers are moved away from the predetermined portion of the display screen 106 and the first graphic overlay element 130 in the second direction. The navigation (zooming) rate is determined to be proportional to the distance the two fingers are moved away from the predetermined portion of the display screen and the first graphic overlay element 130.

The image navigation controller 124 then controls the display 104 to navigate the map shown on the display screen 106 in the zooming mode (as determined by the navigation mode determiner 120) and in the navigation direction and at the navigation rate determined by the navigation feature determiner 122. More specifically, the image navigation controller 124 controls the display 104 to zoom-in or zoom-out on the map (as determined by the navigation feature determiner 122) shown on the display screen 106 at the navigation (zooming) rate determined by the navigation feature determiner 122.

At the same time, the navigation rate reference controller 125 controls the display 104 to present the navigation rate reference marker 144 with the first end in the predetermined portion of the display screen 106 and within the first graphic overlay element 130, and the second end to be either at the position of the two fingers after they have been moved away from the predetermined portion of the display screen 106, or at the second graphic overlay element 132 when the two fingers are moved past the second graphic overlay element 132. Alternatively, the second end of the navigation rate reference marker 144 may be allowed to be placed anywhere on the image displaying portion 126 of the display screen 106 (i.e., beyond the second graphic overlay element 132).

Navigation of the map shown on the display screen 106 according to any of the plurality of different navigation modes may be discontinued by the user lifting the finger(s) from the display screen 106. Additionally, the user may adjust the navigation direction and navigation rate by continuously moving the finger(s) on the display screen 106 relative to the predetermined portion of the display screen 106 and the first graphic overlay element 130.

As described herein, the touch of two or more fingers to the predetermined portion of the display screen 106 may be detected as the simultaneous or near-simultaneous (e.g., substantially simultaneous) touch of the two or more fingers to the display screen 106. Additionally, movement of the two or more fingers away from the predetermined portion of the display screen 106 may be detected as a simultaneous movement of the two or more fingers in a same direction away from the predetermined portion of the display screen 106 (e.g., as opposed to a pinching motion). To improve the convenience of the display system 102, two or more fingers may be detected (or considered) to be touched to the predetermined portion of the display screen 106 when at least one of the fingers is within the predetermined portion of the display screen 106 (i.e., one or more other fingers are outside the predetermined portion of the display screen 106).

The herein-described display system 102 may simplify the map (or image) navigation operation by having navigation of the map shown on the display screen 106 initiated by the user touching the predetermined portion of the display screen 106. Particularly, the user need not determine which portion of the map shown on the display screen 106 should be touched, and can touch to a same place on the display screen 106 for each navigation operation. This may allow the user to navigate the map shown on the display screen 106 in a more expeditious manner, and may prevent or reduce the incidence of accidental navigation (i.e., when a user touches a finger to the display screen 106 without intending to navigate the map shown on the display screen 106). In this regard, the predetermined portion of the display screen 106 may be disposed centrally on the display screen 106 to further ease the user in identifying the predetermined portion of the display screen 106.

Additionally, by having the user navigate the map shown on the display screen 106 with reference to the predetermined portion of the display screen 106, the touch detection mechanisms provided by the display system 102 may be simplified. In this regard, rather than detecting fine movements of the users fingers (e.g., relative to one another), the display system 102 may determine the features of the navigation operation based on a detected final position of the fingers (after movement) using the predetermined portion of the display screen 106 as an origin for movement of the fingers. Accordingly, the touch screen user interface enabling components of the display system 102 may be simplified, which may allow for the display system 102 to be made at a reduced cost.

The graphic overlay 128 notifies the user of the position of the predetermined portion of the display screen 106 (e.g., using the first graphic overlay element 130). Additionally, the graphic overlay may provide the user with a sense of scale when providing navigation instructions, particularly with respect to the navigation rate. In other words, the user may be apprised of a general position of a fast or maximum navigation rate as being an outer boundary of the graphic overlay (e.g., the second graphic overlay element 132). The user can use this information to adjust the movement of the finger(s)

touched to the display screen 106 when navigating the map so as to better control the navigation to be at a desired navigation rate.

Similarly, the navigation rate reference marker 144 may provide the user with a simple mechanism to determine the instructed navigation rate. Particularly, the user can easily tell that as the navigation rate reference marker 144 enlarges, the navigation rate increases. Therefore, the user is provided with a visual cue (in addition to the navigation taking place on the map shown on the display screen 106) notifying the user of the navigation rate being instructed, so that the user may have better control of the display system 102 with respect to controlling the navigation rate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A controller for a vehicular display which displays an image on a display screen and provides a touch screen user interface, the controller comprising:
 a graphic overlay controller configured to control the vehicular display to present a graphic overlay surrounding and demarking a boundary of a predetermined portion of the display screen, wherein the predetermined portion of the display screen is provided at a permanent, fixed position on the display screen and is sized smaller than an image displaying portion of the display screen on which the image is displayed;
 a touch detector configured to detect a number of fingers touched to the predetermined portion of the display screen within the graphic overlay, and a direction and a distance of a simultaneous movement of all of the number of fingers in a same direction from the predetermined portion of the display screen within the graphic overlay to a position on the image displaying portion of the display screen that is outside of the graphic overlay;
 a navigation mode determiner configured to determine a navigation mode for navigating the image displayed on the display screen as one of a plurality of different navigation modes based on the number of fingers detected by the touch detector to be touched to the predetermined portion of the display screen within the graphic overlay;
 a navigation feature determiner configured to determine a navigation direction based on the direction the number of fingers is detected by the touch detector to simultaneously move in the same direction away from the predetermined portion of the display screen and the graphic overlay to the position on the image displaying portion of the display screen that is outside of the graphic overlay, and a navigation rate based on the distance the number of fingers is detected by the touch detector to simultaneously move in the same direction away from the predetermined portion of the display screen and the graphic overlay to the position on the image displaying portion of the display screen that is outside of the graphic overlay; and
 an image navigation controller configured to control the vehicular display to navigate the image displayed on the display screen according to the navigation mode determined by the navigation mode determiner, the navigation direction determined by the navigation feature determiner, and the navigation rate determined by the navigation feature determiner.

2. The controller according to claim 1, wherein the navigation rate is determined, by the navigation feature determiner, to increase as the distance the number of fingers is detected to simultaneously move in the same direction away from the predetermined portion of the display screen by the touch detector and the graphic overlay increases, and to determine the navigation direction based on the direction the number of fingers is detected by the touch detector to simultaneously move away from the predetermined portion of the display screen and the graphic overlay.

3. The controller according to claim 2, further comprising:
 a navigation rate reference controller configured to control the vehicular display to present a navigation rate reference marker on the display screen over the image, the navigation rate reference marker having a first end in the predetermined portion of the display screen within the graphic overlay, and a second end at a position corresponding to that of the number of fingers touched to the display screen following simultaneous movement of the number of fingers in the same direction away from the predetermined portion of the display screen and the graphic overlay, such that the navigation rate reference marker enlarges as the distance the number of fingers is moved away from the predetermined portion of the display screen and the graphic overlay increases.

4. The controller according to claim 1, further comprising:
 a legend controller configured to control the vehicular display to present one of a plurality of legends on the display screen, each of the plurality of legends associated with a unique one of the plurality of different navigation modes, and the legend controller determines the one of the plurality of legends to display to be the legend associated with the navigation mode determined by the navigation mode determiner, wherein each of the plurality of legends indicating to the user the navigation direction associated with the direction of movement of the number of fingers.

5. The controller according to claim 1, wherein the predetermined portion is disposed at a center of the display screen.

6. The controller according to claim 1, wherein the image displayed on the display screen is a map.

7. The controller according to claim 1, wherein the navigation mode determiner determines the navigation mode to be a scrolling mode for a first number of fingers detected by the touch detector to be touched to the predetermined portion of the display screen within the graphic overlay, and a zooming mode for a second number of fingers detected by the touch detector to be touched to the predetermined portion of the display screen within the graphic overlay, the second number of fingers being different than the first number of fingers, wherein when the navigation mode determiner determines the navigation mode to be the scrolling mode, the navigation feature determiner determines the navigation direction to be the direction in which the first number of fingers is moved away from the predetermined portion of the display screen and the graphic overlay, and the navigation rate is a scroll rate that is determined to be proportional to the distance the first number of fingers are moved away from the predetermined portion of the display screen and the graphic overlay, wherein when the navigation mode determiner determines the navigation mode to be the zooming mode, the navigation feature determiner determines the navigation direction to be a zoom-in direction in which the image displayed on the display screen is enlarged when the second number of fingers is detected to move in a first direction away from the predetermined portion of the display screen and the graphic overlay, a zoom-out direction in which the image displayed on the display screen is shrunken when the second number of fingers is detected to move in a second direction away from the predetermined portion of the display screen and the graphic overlay, the second direction being opposite to the first direction, and the navigation rate is a zoom rate and is determined to be proportional to the distance the second number of fingers is moved away from the predetermined portion of the display screen and the graphic overlay.

8. The controller according to claim 7, further comprising:
a navigation rate reference controller configured to control the vehicular display to present a navigation rate reference marker on the display screen, the navigation rate reference marker having a first end in the predetermined portion of the display screen within the graphic overlay, and a second end at a position corresponding to that of the number of fingers touched to the display screen following simultaneous movement of the number of fingers in the same direction away from the predetermined portion of the display screen and the graphic overlay, such that the navigation rate reference marker enlarges as the distance the number of fingers is moved away from the predetermined portion of the display screen and the graphic overlay increases.

9. The controller according to claim 7, further comprising:
a legend controller configured to control the vehicular display to present a scroll legend on the display screen when the navigation mode determined by the navigation mode determiner is the scrolling mode, and to present a zoom legend on the display screen when the navigation mode determined by the navigation mode determiner is the zooming mode, wherein the scroll legend and the zoom legend each indicating to the user the navigation direction associated with the direction of movement of the number of fingers.

10. The controller according to claim 9, wherein
the scroll legend is a plurality of arrows surrounding the predetermined portion of the display screen and the graphic overlay and pointing outwardly therefrom to indicate that movement of the first number of fingers in the direction of any of the plurality of arrows instructs the scrolling in the direction of movement of the first number of fingers, and
the zoom legend is a zoom-in icon provided on a first side of the predetermined portion of the display screen and the graphic overlay and a zoom-out icon provided on a second side of the predetermined portion of the display screen and the graphic overlay, the second side being opposite to the first side, the zoom legend indicating that movement of the second number of fingers in the first direction toward the first side and the zoom-in icon instructs zoom-in of the image and movement of the second number of fingers in the second direction toward the second side and the zoom-out icon instructs zoom-out of the image.

11. A touch screen display system for a vehicle, comprising:
a display including a display screen which displays an image and provides a touch screen user interface; and
a controller configured to control the touch screen user interface, the controller comprising:
a graphic overlay controller configured to control the display to present a graphic overlay surrounding and demarking a boundary of a predetermined portion of the display screen, wherein the predetermined portion of the display screen is provided at a permanent, fixed position on the display screen and is sized smaller than an image displaying portion of the display screen on which the image is displayed;
a touch detector configured to detect a number of fingers touched to the predetermined portion of the display screen within the graphic overlay, and a direction and a distance of a simultaneous movement of all of the number of fingers in a same direction from the predetermined portion of the display screen within the graphic overlay to a position on the image displaying portion of the display screen that is outside of the graphic overlay;
a navigation mode determiner configured to determine a navigation mode for navigating the image displayed on the display screen as one of a plurality of different navigation modes based on the number of fingers detected by the touch detector to be touched to the predetermined portion of the display screen within the graphic overlay;
a navigation feature determiner configured to determine a navigation direction based on the direction the number of fingers is detected by the touch detector to simultaneously move in the same direction away from the predetermined portion of the display screen and the graphic overlay to the position on the image displaying portion of the display screen that is outside of the graphic overlay, and a navigation rate based on the distance the number of fingers is detected by the touch detector to simultaneously move in the same direction away from the predetermined portion of the display screen and the graphic overlay to the position on the image displaying portion of the display screen that is outside of the graphic overlay; and
an image navigation controller configured to control the display to navigate the image displayed on the display screen according to the navigation mode determined by the navigation mode determiner, the navigation direction determined by the navigation feature determiner, and the navigation rate determined by the navigation feature determiner.

12. The touch screen display system according to claim 11, wherein the predetermined portion is disposed at a center of the display screen.

13. The touch screen display system according to claim 11, wherein the navigation feature determiner is configured to determine the navigation rate to increase as the distance the number of fingers is detected by the touch detector to simultaneously move in the same direction away from the predetermined portion of the display screen and the graphic overlay increases, and to determine the navigation direction based on the direction the number of fingers is detected by the touch detector to simultaneously move away from the predetermined portion of the display screen and the graphic overlay, and
the controller further comprises a navigation rate reference controller configured to control the display to present a navigation rate reference marker on the display screen, the navigation rate reference marker having a first end in the predetermined portion of the display screen within the graphic overlay, and a second end at a position corresponding to that of the number of fingers touched to the display screen following simultaneous movement of the number of fingers in the same direction away from the predetermined portion of the display screen and the graphic overlay, such that the navigation rate reference marker enlarges as the distance the number of fingers is moved away from the predetermined portion of the display screen and the graphic overlay increases.

14. The touch screen display system according to claim 11, wherein the controller further comprises a legend controller configured to control the display to present one of a plurality of legends on the display screen, each of the plurality of legends associated with a unique one of the plurality of different navigation modes, and the legend controller determines the one of the plurality of legends to display to be the legend associated with the navigation mode determined by the navigation mode determiner, wherein each of the plurality of legends indicating to the user the navigation direction associated with the direction of movement of the number of fingers.

15. The touch screen display system according to claim 11, wherein the navigation mode determiner determines the navigation mode to be a scrolling mode for a first number of fingers detected by the touch detector to be touched to the predetermined portion of the display screen within the graphic overlay, and a zooming mode for a second number of fingers detected by the touch detector to be touched to the predetermined portion of the display screen within the graphic overlay, the second number of fingers being different than the first number of fingers, wherein when the navigation mode determiner determines the navigation mode to be the scrolling mode, the navigation feature determiner determines the navigation direction to be the direction in which the first number of fingers is moved away from the predetermined portion of the display screen and the graphic overlay, and the navigation rate is a scroll rate that is determined to be proportional to the distance the first number of fingers are moved away from the predetermined portion of the display screen and the graphic overlay, wherein when the navigation mode determiner determines the navigation mode to be the zooming mode, the navigation feature determiner determines the navigation direction to be a zoom-in direction in which the image displayed on the display screen is enlarged when the second number of fingers is detected to move in a first direction away from the predetermined portion of the display screen and the graphic overlay, a zoom-out direction in which the image displayed on the display screen is shrunken when the second number of fingers is detected to move in a second direction away from the predetermined portion of the display screen and the graphic overlay, the second direction being opposite to the first direction, and the navigation rate is a zoom rate and is determined to be proportional to the distance the second number of fingers is moved away from the predetermined portion of the display screen and the graphic overlay.

16. The touch screen display system according to claim 15, wherein the controller further comprises:
a legend controller configured to control the vehicular display to present a scroll legend on the display screen when the navigation mode determined by the navigation mode determiner is the scrolling mode, and to present a zoom legend on the display screen when the navigation mode determined by the navigation mode determiner is the zooming mode,
the scroll legend is a plurality of arrows surrounding the predetermined portion of the display screen and the graphic overlay and pointing outwardly therefrom to indicate that movement of the first number of fingers in the direction of any of the plurality of arrows instructs the scrolling in the direction of movement of the first number of fingers, and
the zoom legend is a zoom-in icon provided on a first side of the predetermined portion of the display screen and the graphic overlay and a zoom-out icon provided on a second side of the predetermined portion of the display screen and the graphic overlay, the second side being opposite to the first side, the zoom legend indicating that movement of the second number of fingers in the first direction toward the first side and the zoom-in icon instructs zoom-in of the image and movement of the second number of fingers in the second direction toward the second side and the zoom-out icon instructs zoom-out of the image.

17. A method for navigating a map presented on a display screen of a vehicular display which provides a touch screen user interface, comprising:
detecting a number of fingers touched to a predetermined portion of a display screen of the vehicular display, the predetermined portion being provided at a permanent, fixed position on the display screen and sized smaller than an image displaying portion of the display screen on which an image is displayed;
determining a navigation mode for navigating the image displayed on the display screen as one of a plurality of different navigation modes based on the number of fingers detected to be touched to the predetermined portion of the display screen; and
detecting a direction and distance the number of fingers is simultaneously moved from the predetermined portion of the display screen to a position on the image displaying portion of the display screen that is away from the predetermined portion of the display screen;
determining a navigation direction based on the direction the number of fingers is detected to simultaneously move away from the predetermined portion of the display screen, and a navigation rate based on the distance the number of fingers is detected to simultaneously move away from the predetermined portion of the display screen; and
navigating the image displayed on the display screen according to the determined navigation mode, navigation direction, and navigation rate.

18. The method according to claim 17, wherein the predetermined portion is disposed at a center of the display screen.

19. The method according to claim 17, wherein the navigation rate is determined to increase as the distance the number of fingers is detected to simultaneously move away from the predetermined portion of the display screen increases, and the navigation direction is determined based on the direction the number of fingers is detected to simultaneously move away from the predetermined portion of the display screen.

20. The method according to claim 19, further comprising:
presenting a graphic overlay surrounding and demarking a boundary of the predetermined portion of the display screen on the display screen; and
presenting a navigation rate reference marker on the display screen over the image, the navigation rate reference marker having a first end in the predetermined portion of the display screen within the graphic overlay, and a second end at a position corresponding to that of the number of fingers touched to the display screen following simultaneous movement of the number of fingers in the same direction away from the predetermined portion of the display screen to a position on the image displaying portion of the display screen that is outside of the graphic overlay, such that the navigation rate reference marker enlarges as the distance the number of fingers is moved away from the predetermined portion of the display screen and outside of the graphic overlay increases.

* * * * *